Figure 1:
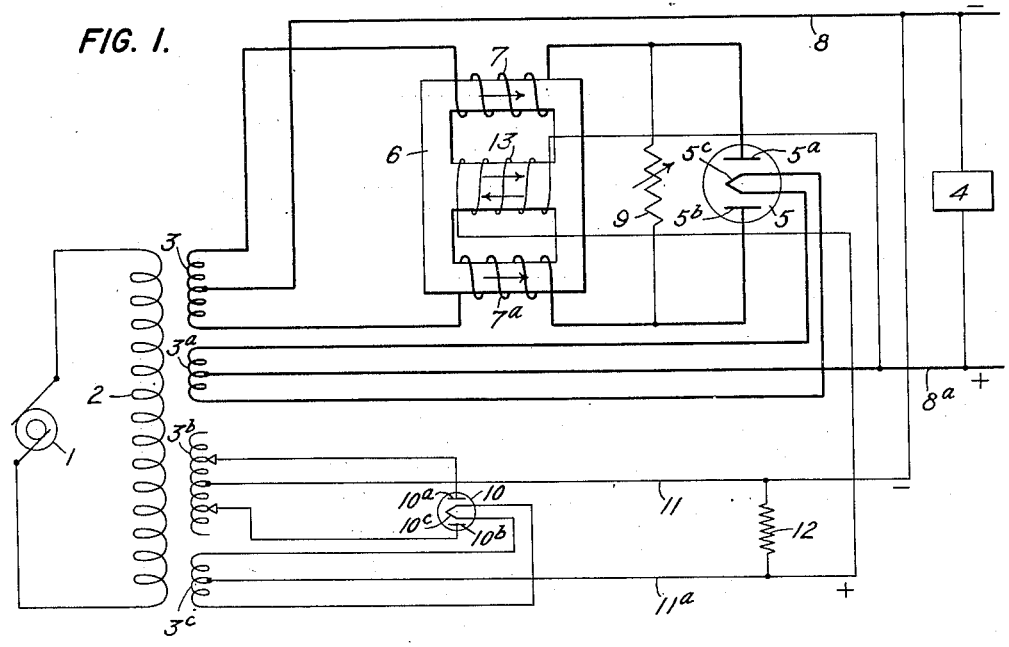

May 12, 1936.  F. G. LOGAN  2,040,492
RECTIFIER REGULATOR
Filed May 31, 1933

INVENTOR
Frank G. Logan
BY
Lawrence K. Sager
his ATTORNEY

Patented May 12, 1936

2,040,492

UNITED STATES PATENT OFFICE 2,040,492

RECTIFIER REGULATOR

Frank G. Logan, Mount Vernon, N. Y., assignor to Ward Leonard Electric Company, a corporation of New York Application May 31, 1933, Serial No. 673,683

14 Claims. (Cl. 175—363)

This invention particularly relates to the control or regulation of the voltage of a consumption circuit wherein the energy is derived from an alternating current source and rectified for use in the consumption circuit. The voltage of the consumption circuit when using a rectifier varies considerably with change of load, the change of voltage between no load and full load being considerable, especially where filtering devices are used. This decrease in the voltage of the direct current consumption circuit with increase of load imposed upon the rectifier, is particularly objectionable in certain uses, it being highly important to maintain the voltage substantially constant under all loads for some purposes, whereas in others it is desirable to have the voltage supplied to the direct current consumption circuit gradually increase with increase of load and in other cases it may be desirable to control the voltage in some particular manner as required in certain uses. The invention also relates to control of the voltage of the consumption circuit regardless of change in voltage of the alternating current source from which the direct current energy is derived.

One of the main objects of the present invention is to provide a method and means of control for automatically regulating the voltage as desired with change of load, or change of supply voltage, or both, by auxiliary controlling apparatus which will be comparatively inexpensive and dependable with long continued use. Another object is to avoid the use of moving parts with their attendant difficulties. Another object is to provide a form of apparatus which will require no particular care or attention during long continued operation. Another object is to provide means which may be conveniently assembled and installed and require small space. Another object is to provide a controller which will be efficient in operation and permit the use of comparatively small controlling current in accomplishing the required regulation. In my pending application Serial No. 671,985, filed May 20, 1933, I have disclosed an improved method of control and form of regulating apparatus for controlling the output voltage of a rectifier under change of load conditions. The present invention as compared therewith, is usually more satisfactory for installations of higher capacity and larger current output as it permits the controlling reactor to be made at lower comparative cost and reduces the total cost of the installation even though the present invention requires an auxiliary device for maintaining a reference voltage.

Other objects and advantages will be understood from the following description and accompanying drawing which illustrates preferred embodiments of this invention.

Figure 2:
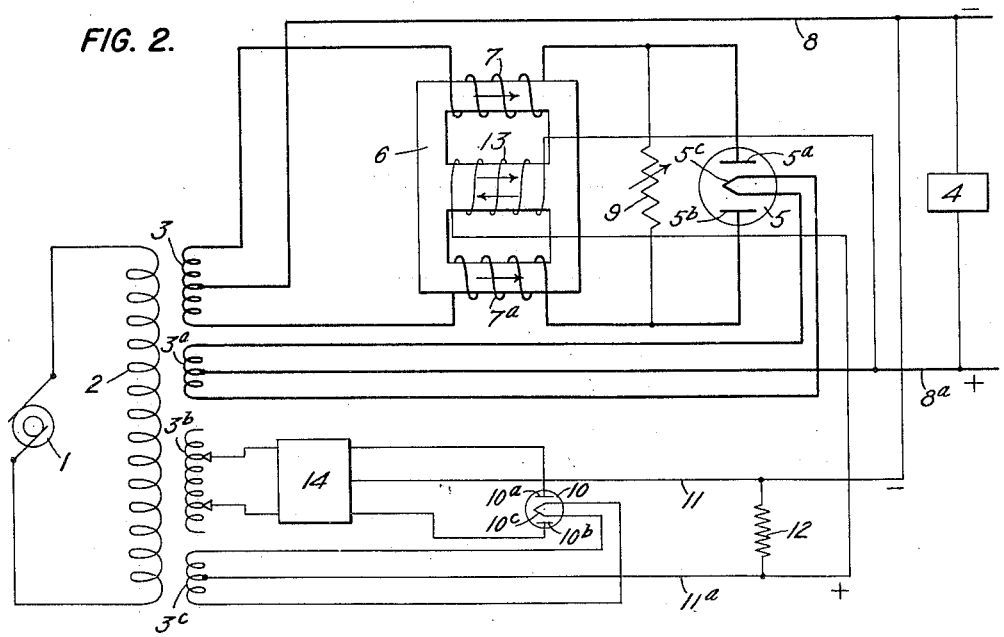

Figure 1 is a diagram indicating the apparatus and showing the connections thereof for control of the output voltage under changing load conditions and Fig. 2 is a similar diagram but which discloses control of the output voltage regardless of changes in the supply voltage, as well as control under changes in the load.

Referring to Fig. 1, an alternating source 1 is shown supplying a transformer having a primary 2 and a plurality of secondary windings 3, 3$^a$, 3$^b$ and 3$^c$. The load 4 is supplied by the main rectifier 5 having the anodes 5$^a$ and 5$^b$ and a cathode 5$^c$, giving full wave rectification.

The controlling reactor is shown as having a laminated core 6 of the three-legged type with the three ends connected by end cross pieces. Around each of the outside legs of this core is a winding 7, 7$^a$. The main secondary winding 3 supplies current to the anodes or plates 5$^a$, 5$^b$ of the rectifier, the upper terminal of the winding 3 being connected to the anode 5$^a$ through the controlling winding 7 shown on the upper leg of the core 6. The lower terminal of the winding 3 is shown connected to the anode or plate 5$^b$ of the rectifier through the controlling winding 7$^a$ on the lower leg of the core 6. Thus the controlling windings 7, 7$^a$ are in series in the anode leads and, in addition to functioning as the usual anode reactors or chokes, also serve, by additional controlling means, to regulate the output voltage of the rectifier. A mid-tap from the secondary 3 extends to form the negative line 8 of the direct current consumption circuit. The cathode or filament 5$^c$, of the main rectifier is supplied with heating current from the secondary winding 3$^a$ of the transformer, a mid-tap 8$^a$ therefrom extending to form the positive line of the consumption circuit.

From a point between the winding 7 and anode 5$^a$ is connected a resistance or impedance device 9, the other terminal thereof being connected to a point between the winding 7$^a$ and the anode 5$^a$. This impedance device may be made adjustable if desired but may be made of a fixed comparatively high value after determining its amount for obtaining satisfactory operation.

An auxiliary rectifier 10 is shown as of the full wave type having the anodes or plates 10$^a$ and 10$^b$ and the cathode or filament 10$^c$. The anodes are respectively connected to the outer terminals of the secondary windings 3$^b$ or, as indicated to adjustable points thereof. The filament is supplied with heating current by being connected to the terminals of the secondary winding 3ᶜ. From the mid-point of this winding extends a lead 11ᵃ to form the positive lead for the direct current derived from the rectifier 10; and from the midpoint of the secondary winding 3ᵇ extends a line 11 to form the negative lead of the output circuit from the rectifier 10. Between the leads 11 and 11ᵃ is connected a resistance 12 of comparatively high value. The negative lead 11 is connected to the negative line 8 of the main rectifier; and the positive lead 11ᵃ of the auxiliary rectifier is connected to the positive line 8ᵃ of the main rectifier through a winding 13 on the middle leg of the controlling reactor core 6. It will thus be seen that the output lines of these two rectifiers are connected in opposition to each other with the controlling winding 12 in series in the connection between the output lines. It is thus apparent that when the voltage of the consumption circuit equals that of the auxiliary rectifier circuit, no current will flow through the winding 13, because the voltages are balanced against each other. When the voltage of the main consumption circuit exceeds that of the output of the auxiliary rectifier, current will flow through the winding 13 in one direction, the resistance device 12 serving as a return path for this current. When the output voltage of the auxiliary rectifier exceeds that of the consumption circuit, current will flow through the winding 13 in the reverse direction.

The windings 7 and 7ᵃ are so connected and wound on the core 6 that the flux due to these windings oppose each other in the core 6, as indicated by the arrows on the upper and lower legs of the core. This flux tends to form a common path in one direction through the middle leg of the core. It is evident that when current passes in one direction through the winding 13, the flux tending to be created thereby will oppose the flux due to the windings 7 and 7ᵃ, as indicated by the upper arrow on the middle leg of the core; and when current flows in the reverse direction in winding 13, the flux tending to be created by this winding will be in the same direction as the flux due to the windings 7 and 7ᵃ, as indicated by the lower arrow on the middle leg of the core, and thus tend to saturate the core.

It is apparent that the current flow through the windings 7, 7ᵃ is always in one direction, assuming the rectifier to be perfect in its action. Owing to the fact that the currents in windings 7 and 7ᵃ are in opposite time phase, the flux in the middle leg of the core will be approximately constant and no material voltage will be induced in the direct current winding 13. The currents in windings 7, 7ᵃ being unidirectional, the inductance of each coil will be less than if a current of alternating character were flowing.

In considering the operation of the apparatus, the effect of the shunting impedance 9 will be disregarded for the present. Let it first be assumed that the load 4 of the direct current consumption circuit is increased. The voltage of the consumption circuit will then tend to fall with the result that its voltage will be less than that of the output voltage of the auxiliary rectifier 10. Owing to this unbalancing of these voltages, a current will flow from the positive lead 11ᵃ of the auxiliary rectifier through the winding 13 in one direction to the positive line 8ᵃ of the consumption circuit and then through the load 4 to the negative line of the consumption circuit and then back to the auxiliary rectifier. The winding 13 is so connected and wound on the core that under these conditions, the flux tending to be created by this flow of current in the winding 13 will be in the same direction in the middle leg of the core 6 as the flux due to the windings 7, and 7ᵃ in this middle leg. Thus the fluxes will be cumulative therein, as indicated by the lower arrow on the middle leg of the core, and tend to approach saturation of the core. The extent of the increase in flux of the core will, of course, depend upon the relative change of the voltages of the consumption circuit and that of the auxiliary rectifier. The increase of flux in the core 6 and through the windings 7, 7ᵃ by reason of the cumulative effect of the winding 13, results in decreasing the reactance of the windings 7, 7ᵃ. Consequently, the counter electromotive forces of these windings will be less and result in an increased voltage being supplied to the anodes 5ᵃ, 5ᵇ of the main rectifier and thereby raise the voltage of the consumption circuit, or prevent its falling to an undesirable amount.

When the load 4 is decreased, the voltage of the consumption circuit will tend to increase and exceed the voltage of the auxiliary rectifier. This results in a current passing from the positive line 8ᵃ of the consumption circuit through the winding 13 in a direction opposite to that just considered and then to the positive lead 11ᵃ of the auxiliary rectifier, thence through the resistance 12 to the negative lead 11 and negative lead 8 of the consumption circuit. This causes the flux due to the winding 13 to oppose that due to the windings 7, 7ᵃ as indicated by the upper arrow on the middle leg of the reactor core. This results in decreasing the flux of the core, with resultant increase in the reactance of the windings 7, 7ᵃ. This causes the counter electromotive force of the windings 7, 7ᵃ to increase and thereby reduce the voltage applied to the anodes of the main rectifier and prevent the voltage of the consumption circuit from materially increasing. The greater the change in relative voltages of the consumption circuit and the auxiliary rectifier, the greater will be the value of the current in the winding 13 and of its opposing flux, thus preventing any objectionable change in the voltage of the consumption circuit with change of load even from full load to a very small load.

As the opposing flux in the winding 13 increases with increase of current therein in the bucking direction, a point will be reached where the flux pulsations due to windings 7 and 7ᵃ will have equal maximum values in the positive and negative sense in the core. At approximately this point, the inductance or reactance of the windings 7, 7ᵃ, will have a maximum value with the result that the reactor will have its maximum effect in preventing increase in voltage of the main rectifier and of the consumption circuit. The resistance 12 should be made such as to limit the value of the bucking current through the winding 13 to this critical amount, as increase of current in the winding 13 beyond this amount would have the opposite effect to that desired. The resistance 12 also serves as a shunt path around the rectifier 10 for the passage of the bucking current and permits such current to flow, as this reverse current could not pass through the rectifier 10 in the reverse direction.

In the above consideration of the operation, the effect of the shunting impedance 9 has been ignored. The use of this shunting impedance has an advantageous effect in amplifying the regulating effect of the controlling reactor and permits the reactor to be made of a smaller capacity for securing the desired control than would be the case without the use of the cooperating impedance device 9. This shunting impedance device is disclosed in various relationships to other apparatus and broadly claimed in my pending application Serial No. 535,600, filed May 7, 1931. It serves to cause an auxiliary current to pass through the windings 7, 7ª during the alternate periods when those windings are inactive in supplying current to the consumption circuit. Considering the winding 7ª, and assuming that this supplies current to the load in a given direction which we may call positive, then during the alternate non-active periods, the impedance device 9 will cause or permit a current, which may be of comparatively small amount, to pass through the winding 7ª in the reverse direction. This will be understood because during the alternate periods when the winding 7ª is inactive in supplying current to the load, the winding 7 will be active in supplying current to the load and, by reason of the shunting impedance 9, a small part of the current supplied by the winding 7 will pass through this shunt and through the winding 7ª back to the source in a direction, say negative, and opposite to that of the current through winding 7ª when it is supplying current to the load. The conditions thus set up in the winding 7ª and its core, as regards flux and energy conditions, tends to establish in greater or lesser degree, as determined by the value of the impedance 9, the conditions which would exist if the winding 7ª and its core had not been subjected to inactive conditions as regards supply of energy to the consumption circuit. Consequently, when the winding 7ª again becomes normally active, the amount of energy and current which this winding is permitted to deliver to the consumption circuit is correspondingly controlled. A similar condition exists with reference to the winding 7 and its core by the controlling effect of the impedance device 9 in causing a controlling current to be passed through the winding 7 in a direction opposite to that of the normal load current therethrough; and this opposite controlling current will pass through the winding 7 during the alternating inactive periods of the winding 7. It has been found in practice that the controlling current due to the presence of the impedance device 9 is very slight for obtaining the desired effect in the control of the load voltage. This shunting impedance 9 may be made a desired fixed value with very advantageous results in the present invention in increasing the control of the voltage of the consumption circuit, but may be made adjustable if desired.

The cooperative effect of the impedance device 9 with the action of the controlling winding 13 will now be considered. Let the condition be assumed that the current in the winding 13 has a bucking direction and that its amount is such that the pulsations and direction of the flux of the core are equally positive and negative, as previously explained. At this time the value of the impedance device 9 is made such as to give the desired voltage to the consumption circuit under small or no load conditions, the controlling reactor then acting to keep the consumption voltage from rising beyond the desired amount. The impedance device 9 then serves to cooperate with the controlling reactor in preventing an undesired rise in voltage of the consumption circuit by the effect of the shunting current passing through the windings 7, 7ª during their inactive periods in supplying the consumption circuit. The value of the impedance device 9 is made such as to give the desired effective cooperative action at this time. When the bucking current in the winding 13 decreases from its most effective value to zero and then, as the controlling current varies in accordance with the requirements of change in load and passes in the cumulative direction and increases in value in the cumulative direction, and thus results in a tendency to increase the voltage of the consumption circuit in the manner already explained, the controlling current through the impedance device 9 is correspondingly increased so that it results in passing a slightly greater current through the windings 7, 7ª during their alternating inactive periods; but this has no appreciable effect because the reactance of the windings 7, 7ª is so low comparatively, as not to be materially affected by the controlling shunting current. Thus the device 9 automatically cooperates with the winding 13 in control of the voltage and increases the range of the control by extending the range in the direction of reduced voltage, and also permits the reactor to be made of smaller capacity than would otherwise be necessary.

The reference voltage of the auxiliary rectifier 10 may be adjusted to the desired amount by adjustment of the connections of the anode leads 2 to the secondary winding 3ᵇ and thereby determine the voltage which is to be maintained upon the direct current consumption circuit. Also, by adjustment of the impedance device 9, the voltage maintained on the direct current consumption circuit may be decreased so as to be maintained at a selected value.

In Fig. 2, the parts corresponding to those of Fig. 1 are similarly numbered and function in a manner, as already described, to maintain the voltage of the consumption circuit approximately constant with change of load. The apparatus of Fig. 2, however, also insures the maintenance of the voltage of the consumption circuit approximately constant regardless of changes in the voltage of the source. For this purpose, there is interposed between the secondary winding 3ᵇ and the auxiliary rectifier 10, an alternating current voltage regulator 14 which will maintain the voltage applied to the rectifier 10 approximately constant regardless of changes in the alternating current source. Such a regulator is disclosed in the Kouyoumjian Patents Nos. 1,828,054 granted October 20, 1931; 1,828,900 granted October 27, 1931 and 1,830,232 granted November 3, 1931, the disclosure of the latter patent being ordinarily the most advantageous. The anode leads of the rectifier 10 are connected to the terminals of the secondary winding of such a regulator and the negative lead 11 connected to a mid-point of the secondary of the regulator as indicated in Fig. 2.

It will be appreciated that with this form of apparatus, the reference voltage of the rectifier 10 is maintained approximately constant and that any rise in voltage of the source of alternating current with the resultant tendency to increase the voltage of the direct current consumption circuit, would be counteracted by the passage of a bucking current in the winding 13 of sufficient amount to increase the reactance of the windings 7, 7ª so as to hold the voltage of the direct current consumption circuit down to its proper value. Similarly, if the voltage of the source decreases, the drop in voltage of the consumption circuit below that of the reference voltage would cause a cumulative current to flow in the winding 13, thereby reducing the reactance of the windings 7, 7ª and result in preventing the voltage of the consumption circuit from falling below a desired minimum. It will also be understood that the impedance device 9 will cooperate with the controlling reactor in the manner already described to maintain the voltage of the consumption circuit approximately constant when the voltage of the alternating current source changes.

In place of deriving the reference voltage from the alternating current source as described in Fig. 1 or Fig. 2, any source that will maintain the desired direct current reference voltage may be used, such as a battery or any suitable supplementary source. It will also be understood by those skilled in the art that the relationship of the windings 7 and 7ª to the winding 13 may be varied with reference to each other and that the proportions of the parts of the core 6 may be varied and the impedance device 9 adjusted so that, by properly relating the parts, the voltage of the direct current consumption circuit may be caused to increase with increase of load, or increase with decrease of the alternating current supply voltage, or otherwise controlled as desired, instead of causing the voltage of the consumption circuit to be maintained substantially constant.

Although, for purposes of explanation, the operation has been mainly described as being due to change of direction of current through the winding 13, the change of conditions may be such as to merely decrease or increase the strength of the cumulative current in the winding 13, or the strength of the bucking current in the winding 13 as distinguished from change of direction of current in this winding. Any form or type of rectifier may be used. Likewise, the form of the controlling reactor and the arrangement of the windings thereon may be varied to suit particular conditions or preference of the designer, the particular form being for general purposes of explanation. Also instead of using a full wave rectifier, two half wave rectifiers may be used; and, in some cases, the invention may be applied to a half wave rectifier when used alone. It will also be understood that the invention, although described as being utilized with a single phase source of supply, is applicable to polyphase alternating current supply circuits in the usual manner of adaptation for polyphase use.

It will be understood that the invention may be embodied in various forms of apparatus and that various applications thereof may be made and various modifications adopted without departing from the scope of the invention.

I claim:—

1. The combination of an alternating current supply circuit, a consumption circuit, a rectifier connected between said circuits, a reactive device connected in series in the rectifier circuit, a winding for affecting the flux of said device, a second rectifier deriving energy from said supply circuit and having its output circuit connected to oppose the voltage of the consumption circuit, said winding being connected in series between said output circuit and the consumption circuit, and a resistance device connected across said output circuit.

2. The combination of an alternating current supply circuit, a consumption circuit, a rectifier connected between said circuits, a reactive device connected in series in the rectifier circuit, a winding for affecting the flux of said device, a second rectifier deriving energy from said supply circuit and having its output circuit connected to oppose the voltage of the consumption circuit, said winding being connected in series between said output circuit and the consumption circuit, and a voltage regulator interposed between said supply circuit and said second rectifier.

3. The combination of an alternating current supply circuit, a consumption circuit, a rectifier connected between said circuits, a reactive device connected in series in the rectifier circuit, a winding for affecting the flux of said device, a second rectifier deriving energy from said supply circuit and having its output circuit connected to oppose the voltage of the consumption circuit, said winding being connected in series between said output circuit and the consumption circuit, a resistance device connected across said output circuit, and a controlling impedance device connected in shunt to said first-named rectifier.

4. The combination of an alternating current supply circuit, a consumption circuit, a rectifier connected between said circuits, a reactive device connected in series in the rectifier circuit, a winding for affecting the flux of said device, a second rectifier deriving energy from said supply circuit and having its output circuit connected to oppose the voltage of the consumption circuit, said winding being connected in series between said output circuit and the consumption circuit, a voltage regulator interposed between said supply circuit and said second rectifier, and a controlling impedance device connected in shunt to said first named rectifier.

5. The combination of an alternating current supply circuit, a consumption circuit, a rectifier connected between said circuits, a reactive device having a winding connected in series between the supply circuit and the rectifier circuit, said winding producing an intermittent flux in said device in one direction, a second winding for affecting the flux of said device, and means affected by change in voltage of the consumption circuit for causing the flux due to said second winding to be in a cumulative direction with the flux of said device or in an opposing direction according to change of voltage of said consumption circuit.

6. The combination of an alternating current supply circuit, a consumption circuit, a rectifier connected between said circuits, a reactive device having a winding connected in series between the supply circuit and the rectifier circuit, said winding producing an intermittent flux in said device, a second winding for affecting the flux of said device in one direction, and an auxiliary direct current voltage source connected to oppose the voltage of the consumption circuit, said second winding being connected in series with said auxiliary source, and said second winding and auxiliary source being connected across the consumption circuit.

7. The combination of an alternating current supply circuit, a consumption circuit, a rectifier connected between said circuits, a reactive device having windings connected in series between the supply circuit and the rectifier circuit, said windings producing a uni-directional flux in a portion of said device, a controlling winding on said portion of the device for affecting said flux, and means affected by change in voltage of the consumption circuit for causing the flux due to said controlling winding to be in a cumulative direction with the flux due to said windings or in an opposing direction according to change of voltage of said consumption circuit.

8. The combination of an alternating current supply circuit, a consumption circuit, a rectifier connected between said circuits, a reactive device having windings connected in series between the supply circuit and the rectifier circuit, said windings producing a uni-directional flux in a portion of said device, a controlling winding on said portion of the device for affecting said flux, and an auxiliary direct current voltage source connected to oppose the voltage of the consumption circuit, said controlling winding being connected in series with said auxiliary source, and said controlling winding and auxiliary source being connected across the consumption circuit.

9. The combination of an alternating current supply circuit, a consumption circuit, a rectifier connected between said circuits, a reactive device having a winding connected in series in the rectifier circuit, said winding being alternately active in producing a uni-directional flux in said device during alternate conducting periods of the supply current wave, a second winding for affecting the flux in said device, an auxiliary direct current voltage source, means affected by change in voltage of the consumption circuit with reference to the voltage of said source for affecting the current in said second winding, and means for passing a controlling current through said first named winding during the alternate non-conducting periods of the supply current wave.

10. The combination of an alternating current supply circuit, a consumption circuit, a rectifier connected between said circuits, a reactive device having a winding connected in series in the rectifier circuit, said winding being alternately active in producing a uni-directional flux in said device during alternate conducting periods of the supply current wave, a second winding for affecting the flux in said device, an auxiliary direct current voltage source connected to oppose the voltage of the consumption circuit, said second winding being connected in series with said auxiliary source, and said second winding and auxiliary source being connected across the consumption circuit, and means for passing a controlling current through said first named winding during the alternate non-conducting periods of the supply current wave.

11. The combination of an alternating current supply circuit, a consumption circuit, a rectifier connected between said circuits, a reactive device having windings connected in series in the rectifier circuit, said windings being alternately active in producing a uni-directional flux in a portion of said device during alternate conducting periods of the supply current wave, a controlling winding on said portion of the device for affecting said flux, means affected by change in voltage of the consumption circuit for affecting the current in said controlling winding, and means for passing a controlling current through said first named windings during the alternate non-conducting periods of the supply current wave.

12. The combination of an alternating current supply circuit, a consumption circuit, a rectifier connected between said circuits, a reactive device having windings connected in series in the rectifier circuit, said windings being alternately active in producing a uni-directional flux in a portion of said device during alternate conducting periods of the supply current wave, a controlling winding on said portion of the device for affecting said flux, an auxiliary direct current voltage source connected to oppose the voltage of the consumption circuit, said controlling winding being connected in series with said auxiliary source, and said controlling winding and said auxiliary source being connected across the consumption circuit, and means for passing a controlling current through said first named windings during the alternate non-conducting periods of the supply current wave.

13. The combination of an alternating current supply circuit, a consumption circuit, a rectifier connected between said circuits, a reactive device having a winding connected in series in the rectifier circuit, said winding being alternately active in producing a uni-directional flux in said device during alternate conducting periods of the supply current wave, an auxiliary reference voltage device, means affected by change of voltage of the consumption circuit with reference to the voltage of said voltage device for affecting the reactance of said reactive device, and means for passing a controlling current through said winding during the alternate non-conducting periods of the supply current wave.

14. The combination of an alternating current supply circuit, a consumption circuit, a rectifier connected between said circuits, a reactive device having a winding connected in series in the rectifier circuit, said winding being alternately active in producing a uni-directional flux in said device during alternate conducting periods of the supply current wave, an auxiliary reference voltage device, means affected by change of voltage of the consumption circuit with reference to the voltage of said voltage device for affecting the reactance of said reactive device, and means for passing a controlling current through said winding during the alternate non-conducting periods of the supply current wave, said last named means being responsive to change of voltage applied to the rectifier.

FRANK G. LOGAN.